US011550774B2

(12) United States Patent
Makovsky et al.

(10) Patent No.: US 11,550,774 B2
(45) Date of Patent: *Jan. 10, 2023

(54) SYSTEM AND METHOD FOR ALERT INSIGHT IN CONFIGURATION MANAGEMENT DATABASES (CMDBS)

(71) Applicant: ServiceNow, Inc., Santa Clara, CA (US)

(72) Inventors: Bnayahu Makovsky, Savyon (IL); Netta Hasdai, Tel Aviv (IL); Ofer Gati, Netanya (IL)

(73) Assignee: ServiceNow, Inc., Santa Clara, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 17/084,246

(22) Filed: Oct. 29, 2020

(65) Prior Publication Data

US 2021/0049142 A1 Feb. 18, 2021

Related U.S. Application Data

(63) Continuation of application No. 15/943,490, filed on Apr. 2, 2018, now Pat. No. 10,824,616.

(51) Int. Cl.
*G06F 16/00* (2019.01)
*G06F 16/23* (2019.01)
(Continued)

(52) U.S. Cl.
CPC ........ *G06F 16/2358* (2019.01); *G06F 3/0482* (2013.01); *G06F 11/0709* (2013.01);
(Continued)

(58) Field of Classification Search
CPC .... G06F 16/2358; G06F 16/21; G06F 16/252; G06F 3/0482; G06F 11/0709;
(Continued)

(56) References Cited

U.S. PATENT DOCUMENTS 6,321,229 B1 11/2001 Goldman
6,799,189 B2 9/2004 Huxoll
(Continued)

OTHER PUBLICATIONS

Sara Nadi; "DRACA: Decision-support for Root Cause Analysis and Change Impact Analysis", Dec. 1, 2009, XP0556511476; retrieved from internet: https://uwspace.uwaterloo.ca/bitstream/handle/10012/4889/NADI_SARA.pdf (retrived on Aug. 7, 2019).

*Primary Examiner* — Hung Q Pham
(74) *Attorney, Agent, or Firm* — Fletcher Yoder PC

(57) ABSTRACT

A method of managing alerts in a client instance associated with a configuration management database (CMDB) platform is disclosed. The method includes: receiving a request identifying a particular CI and a particular alert; identifying related CIs from a plurality of CIs associated with the client instance based on the particular CI and the particular alert; identifying alerts, incidents (INTs), changes (CHGs), and problems (PRBs) of the client instance that are associated with either the particular CI or the related CIs; determining frequency data for the alerts, INTs, CHGs, and PRBs associated with the particular CIs and frequency data for the alerts, INTs, CHGs, and PRBs associated with the related CIs; and sending a response that includes the frequency data for the alerts, INTs, CHGs, and PRBs associated with the particular CIs to be presented alongside the frequency data for the alerts, INTs, CHGs, PRBs associated with the related CIs.

20 Claims, 6 Drawing Sheets

(51) Int. Cl.
*G06F 16/21* (2019.01)
*G06F 16/25* (2019.01)
*G06F 3/0482* (2013.01)
*G06F 11/34* (2006.01)
*G06F 11/07* (2006.01)
*H04L 41/069* (2022.01)
*H04L 41/0631* (2022.01)
*H04L 41/0853* (2022.01)

(52) U.S. Cl.
CPC ......... *G06F 11/3409* (2013.01); *G06F 16/21* (2019.01); *G06F 16/252* (2019.01); *H04L 41/065* (2013.01); *H04L 41/069* (2013.01); *H04L 41/0856* (2013.01)

(58) Field of Classification Search
CPC .. G06F 11/3409; H04L 41/065; H04L 41/069; H04L 41/0856
See application file for complete search history.

(56) References Cited

U.S. PATENT DOCUMENTS

| | | |
|---|---|---|
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,925,981 B2 | 4/2011 | Pourheidar |
| 7,933,927 B2 | 4/2011 | Dee |
| 7,945,860 B2 | 5/2011 | Vambenepe |
| 8,082,222 B2 | 12/2011 | Rangarajan |
| 8,151,261 B2 | 4/2012 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,769,339 B2 | 7/2014 | Sonoda et al. |
| 8,832,652 B2 | 9/2014 | Mueller |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,317,327 B2 | 4/2016 | Apte |
| 9,317,829 B2 | 4/2016 | Anand et al. |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,632,861 B1 | 4/2017 | Watanabe et al. |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 10,002,203 B2 | 6/2018 | George |
| 2012/0054554 A1 | 3/2012 | Dagan |
| 2015/0222504 A1 | 8/2015 | Srivastava |
| 2017/0220938 A1 | 8/2017 | Sainani et al. |

SYSTEM AND METHOD FOR ALERT INSIGHT IN CONFIGURATION MANAGEMENT DATABASES (CMDBS)

CROSS-REFERENCE TO RELATED APPLICATION

This application is a continuation of U.S. patent application Ser. No. 15/943,490, filed Apr. 2, 2018, issuing as U.S. Pat. No. 10,824,616 on Nov. 3, 2020, which is incorporated herein by reference in its entirety.

BACKGROUND

The present disclosure relates generally to configuration management databases (CMDB s) and, more particularly, to providing enhanced alert insight by using related configuration items (CIs) in CMDBs.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called software as a service (SaaS) and platform as a service (PaaS) technologies. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Within the context of cloud computing solutions for CMDBs, users may be asked to deal with ever increasing amounts of data, e.g., with respect to the number of Configuration Items (CIs) stored in the CMDB (including such CIs' relevant metadata, such as manufacturer, vendor, location, etc.), as well as the alerts, service metrics, and maintenance status information related to such CIs. In fact, the amount of data collected and stored in today's cloud computing solutions, such as CMDBs, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of data to properly and efficiently perform their job functions.

In a logical sense, CIs of a CMDB can be related in a number of ways. For example, a first CI may host or execute a second CI, the first CI may operate in parallel with the second CI, the first CI may be a part of a hierarchy that include the second CI, and so forth. As such, in the absence of present disclosure, it is recognized that a widely accepted definition for relationships between CIs of a CMDB is lacking in the field. As such, when an issue arises with a particular CI of a CMDB, traditional CMDBs lack a feature that enables the user to identify related CIs or determine how the issue has historically affected the related CIs. With this in mind, the following embodiments are directed to defining relationships between CIs and enhancing user experience by enabling the user to compare issues experienced by a particular CI with issues experienced by related CIs of the CMDB.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed toward improving a user's ability to explore and determine a root cause and/or a solution for a particular alert associated with a particular CI of a CMDB. To do this, present embodiments include instructions that enable a client instance to determine CIs that are related to a particular CI. In particular, present embodiments include a method of determining CIs that are related to a particular CI based on a combination of a topological relationship and an alert group relationship between the particular CI and the other CIs associated with the client instance. Accordingly, after the particular CI has been associated with the particular alert, present embodiments enable the client instance to determine how frequently the CI has been associated with the particular and other issues (e.g., INTs, CHGs, PRBs), as well as how frequently related CI have experienced the particular alert and other issues. Additionally, present embodiments include a graphical user interface (GUI) designed to concurrently present data indicating the frequency at which the particular CI has historically experienced issues alongside data indicating the frequency at which the related CIs have historically experienced issues.

In an example embodiment, a client instance associated with a CMDB platform is executed by a computing system. The client instance is configured to receive a request identifying a particular CI and a particular alert. Using the particular CI identified in the request, the client instance determines a respective combined score for each of a plurality of CIs by combining a respective topological relationship score and a respective alert group relationship score of each CI relative to the particular CI. The client instance determines that CIs in the plurality of CIs having a respective combined score that is greater than a predetermined threshold value are related to the particular CI. The client instance determines frequency data for issues (e.g., alerts, INTs, CHGs, and PRBs) associated with the particular CI, as well as frequency data for issues (e.g., alerts, INTs, CHGs, and PRBs) associated with the related CIs, and provides this information to the client device for concurrent presentation on the client device.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
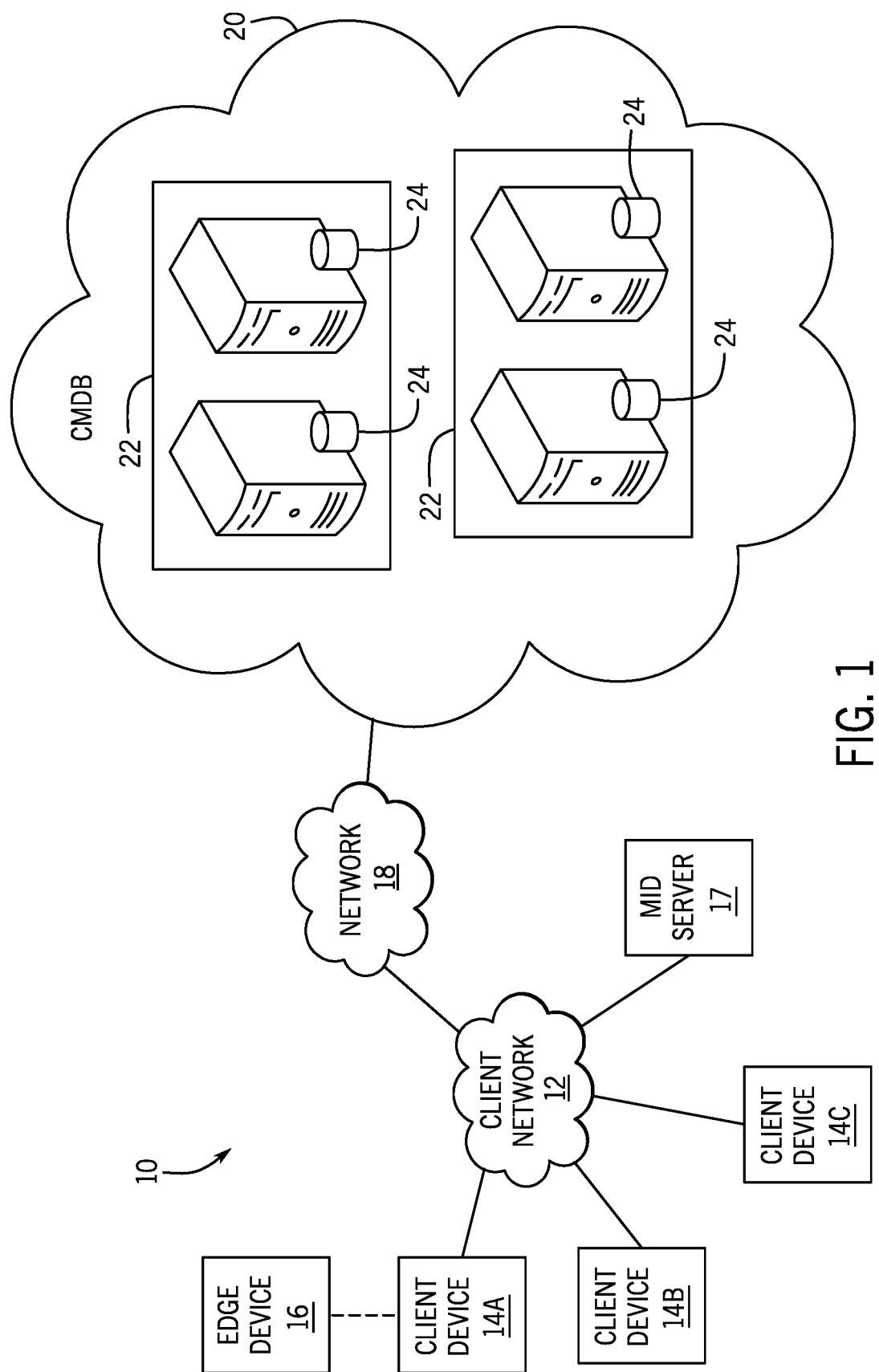
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to a single electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which all relevant data, such as manufacturer, vendor, location, or similar data, is stored in a CMDB. As used herein, the terms alerts, incidents (INTs), changes (CHGs), and problems (PRBs) are used in accordance with the generally accepted use of the terminology for CMDBs. Moreover, the term "issues" with respect to a CI of a CMDB collectively refers to alerts, INTs, CHGs, and PRBs associated with the CI.

Present embodiments are directed toward an alert insight system of a CMDB platform that enables client instances to determine which CIs are related to a particular CI, such that frequency data for various issues (e.g., alerts, INTs, CHGs, and PRBs) associated with the particular CI and related CIs can be generated for presentation to a user. In particular, present embodiments include a method of determining CIs that are related to a particular CI in a client instance of a CMDB platform based on a combination of a topological relationship and an alert group relationship between the particular CI and other CIs of the client instance. As discussed, for a particular alert associated with a particular CI, present embodiments enable the client instance to determine how frequently the particular CI generates the particular alert and other issues (e.g., INTs, CHGs, and PRBs) associated with the particular CI. Further, present embodiments enable the client instance to determine how frequently related CIs generate the particular alert and other issues (e.g., INTs, CHGs, and PRBs) associated with the related CIs. Additionally, present embodiments include a graphical user interface (GUI) designed to present frequency data for issues associated with the particular CI and related CIs in a concise and organized format, which enables a user to more quickly and easily explore and determine a root cause and/or a solution for the particular CI generating the particular alert.

Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and CMDB platform 20. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the CMDB platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the CMDB platform 20. FIG. 1 also illustrates that the client network 12 includes a management, instrumentation, and discovery (MID) server 17 that facilitates communication of data between the network hosting the CMDB platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-C and the network hosting the CMDB platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the CMDB platform 20 may be a remote network (e.g., a cloud network) that is able to communicate with the client devices 14A-C via the client network 12 and network 18. The network hosting the CMDB platform 20 provides additional computing resources to the client devices 14A-C and/or client network 12. For example, by utilizing the network hosting the CMDB platform 20, users of client devices 14A-C are able to build and execute applications, such as CMDBs or other automated processes for various enterprise, IT, and/or other organization-related functions, such as alert processing and handling. In one embodiment, the network hosting the CMDB platform 20 includes one or more data centers 22, where each data center could correspond to a different geographic location. Each of the data centers 22 includes a plurality of server instances 24 (also referred to herein as application instances or application server instances), where each server instance can be implemented on a physical computing system, such as a single electronic computing device (e.g., a single physical hardware server) or could be in the form a multi-computing device (e.g., multiple physical hardware servers). Examples of server instances 24 include, but are not limited to a web server instance (e.g., a unitary Apache installation), an application server instance (e.g., unitary Java® Virtual Machine), and/or a database server instance, e.g., a unitary MySQL® catalog (MySQL® is a registered trademark owned by MySQL AB A COMPANY).

To utilize computing resources within the CMDB platform 20, network operators may choose to configure the data centers 22 using a variety of computing infrastructures. In one embodiment, one or more of the data centers 22 are configured using a multi-tenant cloud architecture, such that one of the server instances 24 handles requests and serves multiple customers. In other words, data centers with multi-tenant cloud architecture commingle and store data from multiple customers, where multiple customer instances are assigned to one of the server instances 24. In a multi-tenant cloud architecture, the particular server instance of the server instances 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure to a particular one of the server instances 24 causing outages for all customers allocated to the particular server instance.

In another embodiment, one or more of the data centers 22 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance and/or other combinations of server instances 24, such as one or more dedicated web server instances, one or more dedicated application server instances, and one or more database server instances, for each customer instance. In a multi-instance cloud architecture, multiple customer instances could be installed on a single physical hardware server, where each customer instance is allocated certain portions of the physical server resources, such as computing memory, storage, and processing power. By doing so, each customer instance has its own unique software stack that provides the benefit of data isolation, relatively less downtime for customers to access the CMDB platform 20, and customer-driven upgrade schedules. An example of implementing a customer instance within a multi-instance cloud architecture will be discussed in more detail below with reference to FIG. 2.

Figure 2:
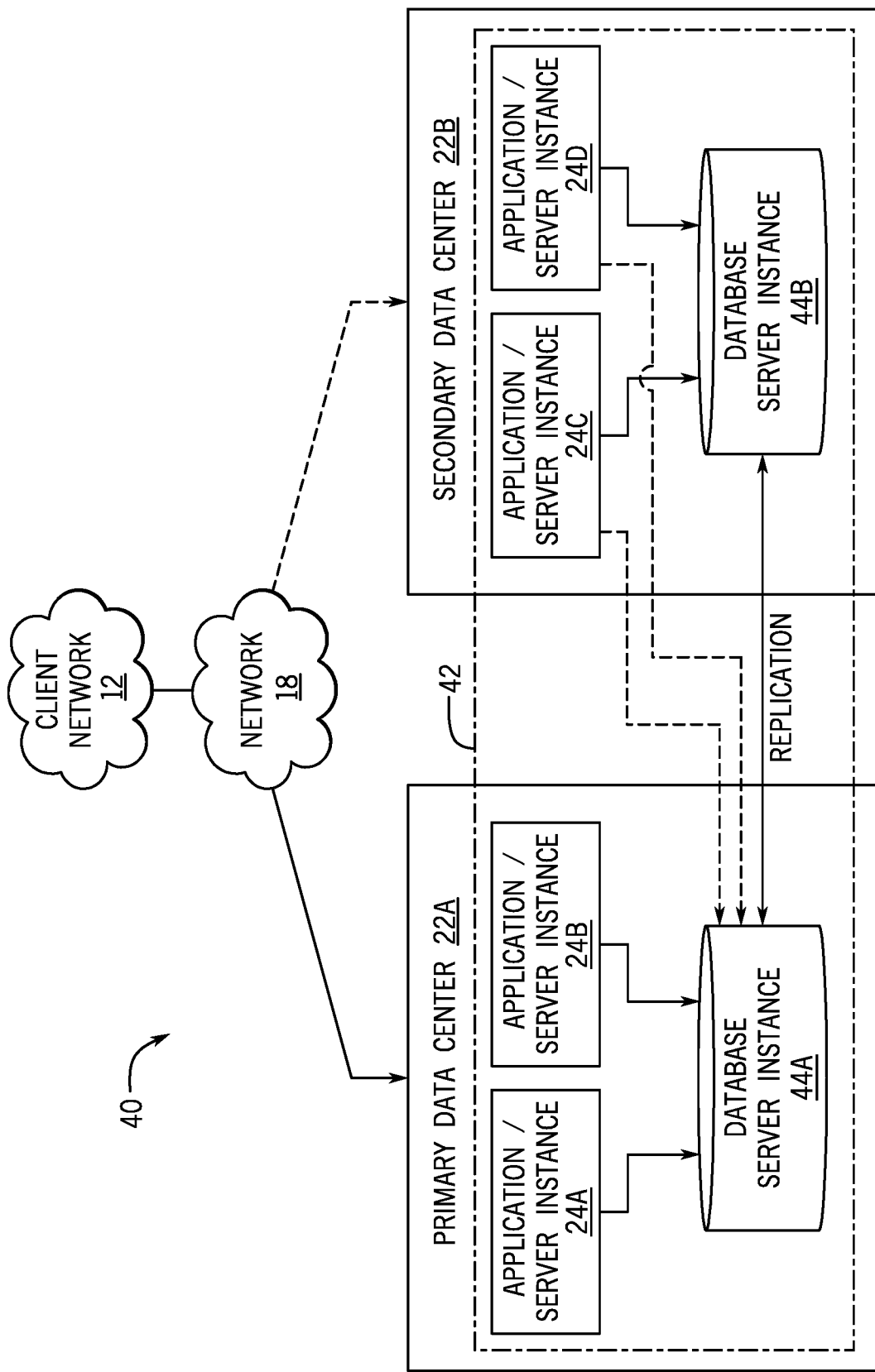
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two data centers 22A and 22B. Data centers 22A and 22B can correspond to data centers 22 illustrated in FIG. 1 as located within the CMDB platform 20. Using FIG. 2 as an example, network environment and service provider cloud infrastructure client instance 42 (also referred to herein as a simply client instance 42) is comprised of four dedicated application server instances 24A, 24B, 24C, and 24D and two dedicated database server instances 44A and 44B. Stated another way, the application server instances 24A-24D and database server instances 44A and 44B are not shared with other client instances. Other embodiments of the multi-instance cloud architecture 40 could include other types of dedicated server instances, such as a web server instance. For example, the client instance 42 could include the four dedicated application server instances 24A-24D, two dedicated database server instances 44A and 44B, and four dedicated web server instances (not shown in FIG. 2).

To facilitate higher availability of the client instance 42, the application server instances 24A-24D and database server instances 44A and 44B are allocated to two different data centers 22A and 22B, where one of the data centers 22 acts as a backup data center. In reference to FIG. 2, data center 22A acts as a primary data center 22A that includes a primary pair of application server instances 24A and 24B and the primary database server instance 44A for the client instance 42, and data center 22B acts as a secondary data center 22B to back up the primary data center 22A for the client instance 42. To back up the primary data center 22A for the client instance 42, the secondary data center 22 includes a secondary pair of application server instances 24C and 24D and a secondary database server instance 44B. The primary database server instance 44A is able to replicate data to the secondary database server instance 44B.

As shown in FIG. 2, the primary database server instance 44A may replicate data to the secondary database server instance 44B using, e.g., a Master-Master MySQL Binlog replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the application server instances 24A and 24B and/or primary data server instance 44A fails and/or is under maintenance, data traffic for client instances 42 can be diverted to the secondary application server instances 24C and the secondary database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the CMDB platform 20 is implemented using data centers, other embodiments of the of the CMDB platform 20 are not limited to data centers and can utilize other types of remote network infrastructures. Moreover, other embodiments of the present disclosure may combine one or more different server instance into a single server instance. Using FIG. 2 as an example, the application server instances 24A-D and database server instances 44A and 44B may be combined into a single server instance. The use and discussion of FIGS. 1 and 2 are only examples to facilitate ease of description and explanation and are not intended to limit the disclosure to the specific examples illustrated therein.

As mentioned, present embodiments are directed to an embodiment of the CMDB platform 20 having functionality that enables the client instance 42 to determine which CIs are related to a particular CI. Using this functionality, the client instance 42 is able to identify issues (e.g., alerts, INTs, CHGs, and PRBs) associated with the particular CI and related CIs, as well as determine frequency data for these issues. Additionally, client instance 42 includes a graphical user interface (GUI) that is designed to present frequency data for issues associated with the particular CI and associated with related CIs. As discussed below, the GUI may include a plurality of widgets, wherein each widget is configured to present frequency data an issue (e.g., alerts, INTs, CHGs, PRBs) associated with particular CI, and to present frequency data for issues associated with related CIs, enabling the user to effectively explore root causes and/or solutions associated with the particular alert and particular CI.

Figure 3:
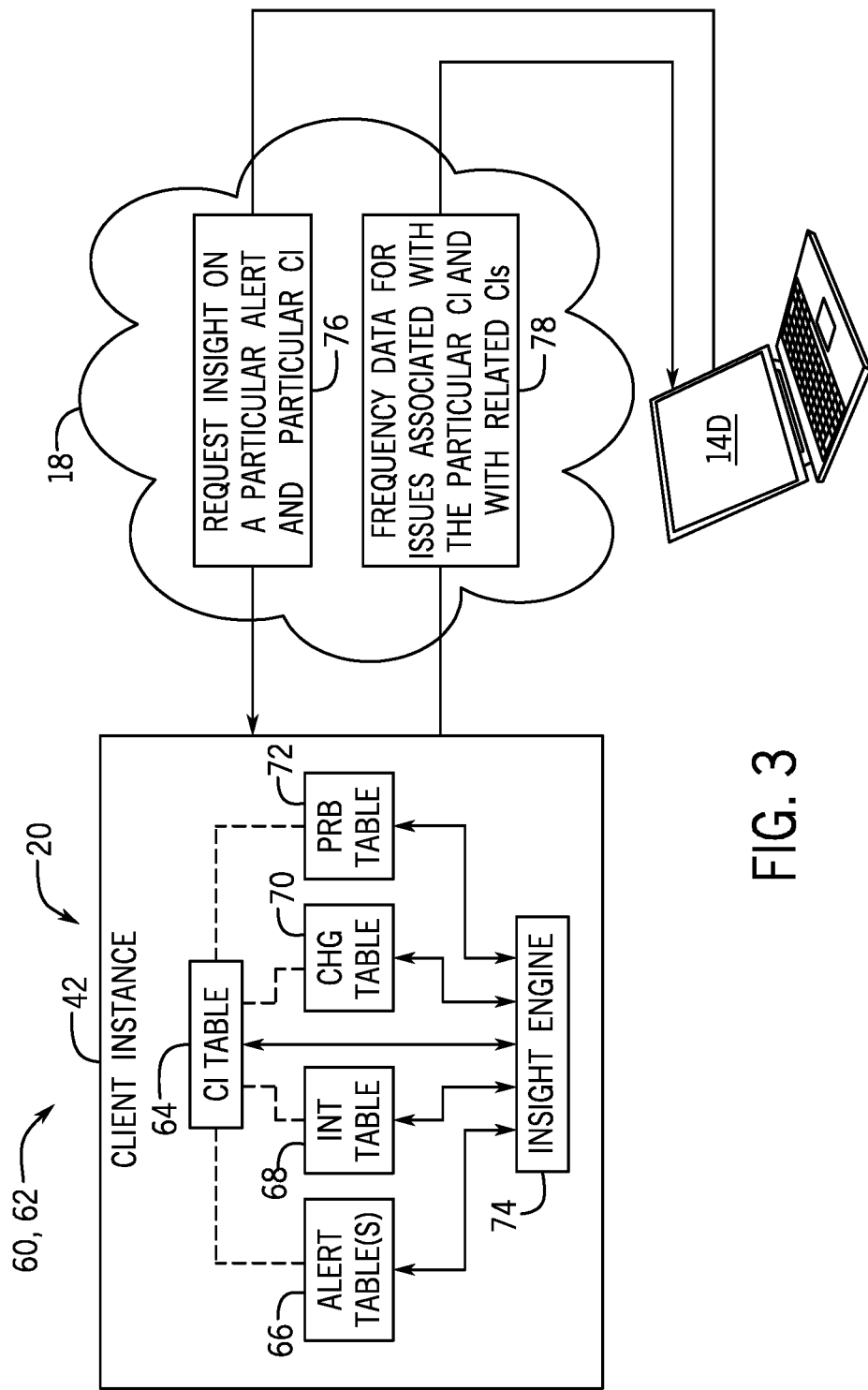
FIG. 3 is a block diagram of an alert insight system that is associated with a CMDB platform, in accordance with embodiments of the present technique.

With the foregoing in mind, FIG. 3 illustrates an alert insight system 60, in accordance with embodiments of the present technique. More specifically, FIG. 3 is a block diagram 62 illustrating an embodiment the client instance 42 that may be used to support the alert insight system 60, according to one or more disclosed embodiments. Block diagram 62 illustrates an example of a portion of a service provider cloud infrastructure, including the CMDB platform 20 discussed above. The CMDB platform 20 is connected to a client device 14D via the network 18 to provide a user interface to network applications executing within the client instance 42 (e.g., via a web browser of the client device 14D). Client instance 42 includes cloud resources and server instances similar to those explained with respect to FIG. 2, and is illustrated here to show support for an alert insight capability within the client instance 42. Cloud provider infrastructures are generally configured to support a plurality of end-user devices, such as client device 14D, concurrently, wherein each end-user device is in communication with the single client instance 42. Also, cloud provider infrastructures may be configured to support any number of client instances, such as client instance 42, concurrently, with each of the instances in communication with one or more end-user devices. As mentioned above, an end-user may also interface with client instance 42 using an application that is executed within a web browser.

For the embodiment of the alert insight system 60 illustrated in FIG. 3, the client instance 42 includes (e.g., hosts, stores) at least one CI table 64 that generally includes any suitable number of fields storing information related to CIs associated with the client instance 42. The client instance 42 also includes at least one alert table 66, INT table 68, CHG table 70, and PRB table 72, which respectively store alerts, INTs, CHGs, and PRBs associated with CIs of the client instance 42 of the CMDB platform 20. As such, for the illustrated embodiment, each of the alert table 66, the INT table 68, the CHG table 70, and the PRB table 72 includes at least one field that refers to the CI table 64 (e.g., a foreign key value that points to the primary key of the CI table 64). For example, in certain embodiments, a CI field of the alert table 66, INT table 68, CHG table 70, and/or PRB table 72 may store a value (e.g., a JavaScript Object Notation (JSON) string) that uniquely identifies a particular CI associated with the client instance 42 from the CI table 64. Additionally, other relationships may exist between tables of the client instance 42. For example, in certain embodiments, one or more of the INT table 68, the CHG table 70, and the PRB 72 may include at least one field that refers to the alert table 66 (e.g., a foreign key value that points to the primary key of the alert table 66) to store a relationship between alerts and INTs/CHGs/PRBs of the client instance 42.

Additionally, the illustrated client instance 42 includes an insight engine 74, which is an application that includes instructions that are executed by at least one suitable processor of the computer system to enable the client instance 42 to generate (e.g., determine, identify, select) suitable data regarding issues (e.g., alerts, INTs, CHGs, and PRBs) associated with CIs of the client instance 42 in response to client requests. That is, the insight engine 74 is configured to access or query the aforementioned CI table 64, the alert table 66, the INT table 68, the CHG table 70, and the PRB table 72 to assemble data to be presented to the client device 14D in response to a client request 76.

In particular, for the embodiment illustrated in FIG. 3, the client device 14D provides the request 76 to the client instance 42, via the network 18, to explore or gain insight with respect to a particular alert and a particular CI. In response to receiving this request 76, the insight engine 74 of the client instance 42 determines which CIs are related to the particular CI, as discussed below. The insight engine 74 also determines frequency data (e.g., total counts within a predefined time window) for issues associated with the particular CI, as well as frequency data for issues of the related CIs. Finally, the client instance 42 provides a response 78, via the network 18, to the client device 14D that includes frequency data for issues (e.g., for alerts, INTs, CHGs, and PRBs) associated with the particular CI, as well as frequency data for issues associated with CIs related to the particular CI. Additionally, in certain embodiments, the response 78 includes details (e.g., an identifier, timestamp, description, severity, priority, state, source, etc.) pertaining to the issues associated with the particular CI and related CIs to be presented to the user along with the aforementioned frequency data.

Figure 4:
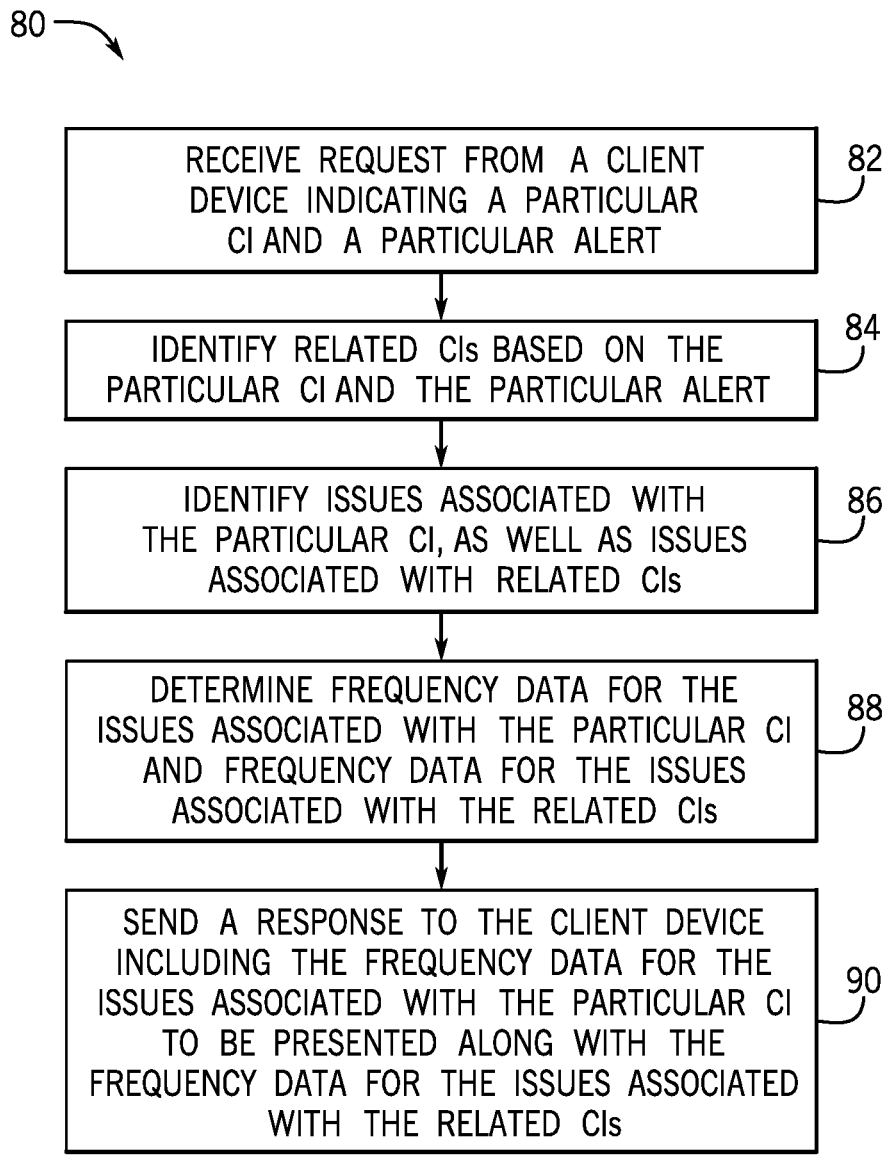
FIG. 4 is a flow diagram of a process whereby a client instance associated with the CMDB platform handles a request to explore a particular issue for a particular CI, in accordance with embodiments of the present technique.

FIG. 4 is a flow diagram illustrating an embodiment of a process 80 whereby a client instance 42 (e.g., the insight engine 74 of the client instance 42) handles the request 76 to explore the particular alert for the particular CI, in accordance with the present technique. The process 80 may be in the form of an application that includes instructions that are executed by at least one suitable processor of the computer system as part of the client instance 42 (e.g., as part of the insight engine 74 of FIG. 3). The illustrated process 80 is merely provided as an example, and in other embodiments, certain illustrated steps of the process 80 may be performed in other orders, skipped, or repeated, in accordance with the present disclosure.

For the illustrated embodiment, the process 80 begins with the client instance 42 receiving (block 82) the request 76 from the client device 14D indicating a particular alert and a particular CI. For example, the request 76 from the client device 14D may include a value (e.g., a JSON string representing a CI identifier) that uniquely identifies the particular CI stored within the CI table 64 of the client instance 42. Additionally, the request 76 may include a value (e.g., a JSON string representing an alert identifier) that uniquely identifies the particular alert within the alert table 66 of the client instance 42. The client instance 42 then identifies (block 84) related CIs based on the particular CI indicated in the request received in block 82. An example of a process by which the client instance 42 identifies related CIs is discussed in greater detail with respect to FIG. 5.

Continuing through the illustrated embodiment of the process 80, once the client instance 42 has identified CIs related to the particular CI, then the client instance 42 identifies or selects (block 86) issues (e.g., alerts, INTs, CHGs, and PRBs) associated with the particular CI, as well as issues associated with the related CIs. It may be noted that, in certain embodiments, certain issues (e.g., INTs, CHGs, and/or PRBs) may further be limited to those that are associated with both the related CIs and the particular alert. For example, in certain embodiments, the client instance 42 specifically identifies or selects INTs that are associated with the related CIs and the particular alert received in block 82.

Continuing through the illustrated embodiment of the process 80, the client instance 42 determines (block 88) frequency data for the issues associated with the particular CI and frequency data for the issues associated with the related CIs. In certain embodiments, the client instance 42 may first query each of the alert table 66, the INT table 68, the CHG table 70, and the PRB table 72 to identify the issues associated with the particular CI and with the related CIs over a specified period of time (e.g., days, weeks, months), and then may separately count (e.g., sum, total) the issues from the results of the query to determine the frequency data for the particular CI and for the related CIs. In other embodiments, the client instance 42 may instead generate a query that both selects and separately sums the appropriate issues associated with the particular CI and with the related CIs from the alert table 66, the INT table 68, the CHG table 70, and the PRB table 72 to generate the desired frequency data of block 88.

Continuing through the embodiment illustrated in FIG. 4, the process 80 concludes with the client instance 42 sending (block 90) the response 78 to the client device 14D. As mentioned, the response 78 includes the frequency data for the issues associated with the particular CI, as well as the frequency data for the issues associated with the related CIs. More specifically, the frequency data for the alerts, INTs, CHGs, and PRBs associated with the particular CI and the frequency data for the alerts, INTs, CHGs, and PRBs associated with the related CIs are provided to the client device 14D to be concurrently presented on a display of the client device 14D. Additionally, as noted, in certain embodiments, the response 78 may include additional details (e.g., an identifier, timestamp, description, severity, priority, state, source, etc.) for each of the issues associated with the particular CI and/or the related CIs to be presented on the display of the client device 14D concurrently with the frequency data.

Figure 5:
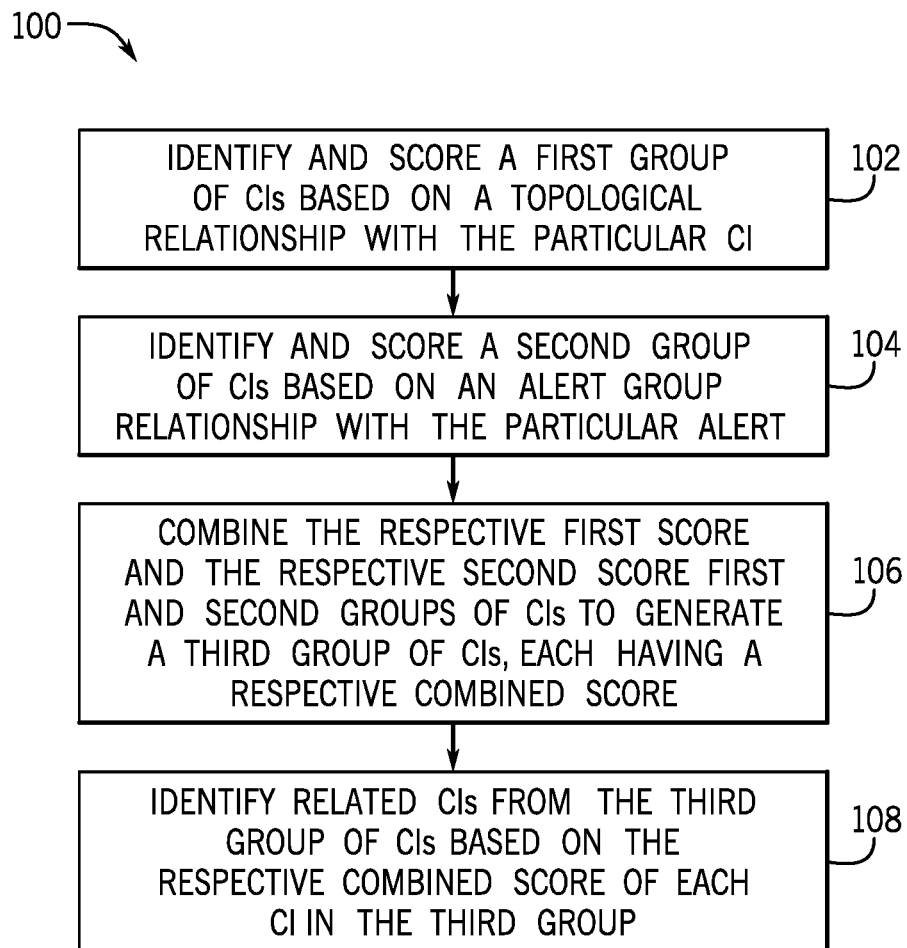
FIG. 5 is a flow diagram of a process whereby the client instance determines CIs that are related to a particular CI as part of handling the request to explore the particular issue for the particular CI, in accordance with embodiments of the present technique.

FIG. 5 is a flow diagram illustrating an embodiment of a process 100 whereby the client instance 42 (e.g., the insight engine 74 of the client instance 42 of FIG. 3) determines CIs that are related to a particular CI, in accordance with the present technique. The process 100 may be in the form of an application that includes instructions executed by at least one suitable processor of the computer system as part of the client instance 42 (e.g., as part of the insight engine 74). The illustrated process 100 is merely provided as an example, and in other embodiments, certain illustrated steps of the process 100 may be performed in other orders, skipped, or repeated, in accordance with the present disclosure. The process 100 is described below with reference to Tables 1, 2, and 3.

For the embodiment illustrated in FIG. 5, the process 100 begins with the client instance 42 identifying and scoring (block 102) a first group of CIs based on a topological relationship with the particular CI. As used herein, a "topological relationship" describes to how two CIs associated with a client instance of a CMDB platform operate with respect to one another to perform their intended enterprise functions. For example, a topological relationship may include a first CI "hosting" a second CI, wherein the reciprocal topological relationship includes the second CI being "contained by" the first CI. In addition to "hosting" and "contained by" topological relationships, a first CI may be related to a second CI within an application flow, such that the first CI is "dependent on" the second CI with respect to a particular service, or vice versa. It may be appreciated that the topological relationship data may be defined in and gleaned from metadata relationships and service mappings of the client instance 42.

Accordingly, in block 102, the client instance 42 determines a respective topological relationship score for each CI of the first group of CIs based on the topological relationship between the CI and the particular CI. For example, in an embodiment, the client instance 42 first determines whether any CIs are "hosting" or "contained by" the particular CI, whether any CIs are "dependent on" the particular CI, or whether the particular CI is "dependent on" any other CIs. Any CI falling into these categories comprise CIs having a first level topological relationship with the particular CI.

TABLE 1

Example of topological relationship scoring.

| Configuration Item (CI) Identifier | Topological Relationship Level | Topological Relationship Score |
|---|---|---|
| <CI 1> | 1 | 3 |
| <CI 2> | 1 | 3 |
| <CI 3> | 2 | 2 |
| <CI 4> | 3 | 1 |
| <CI 5> | 3 | 1 |

An example of the topological scoring of block 102 is indicated in Table 1. Each record in the Table 1 includes a respective value for a CI identifier field that uniquely identifies a CI in the CI table 64, wherein "<CI 1>" represents a unique identifier (e.g., a JSON string representing a CI identifier) corresponding to a first CI, "<CI 2>" represents a unique identifier (e.g., a JSON string representing a CI identifier) corresponding to a second CI, and so forth. Each record in Table 1 also includes a topological relationship score field storing a positive integer value that is indicative of a strength of the topological relationship between the indicated CI and the particular CI. Each of the CIs having first level topological relationship with the particular CI receives a topological relationship score that is relatively higher than other CIs having distant or absent topological relationship with the particular CI. In the example indicated in Table 1, two CIs are identified as having a first level topological relationship with the particular CI and are assigned a relatively higher (or highest) topological relationship score (e.g., 3).

Once CIs having a first level topological relationship with the particular CI have been identified and scored, the topological scoring process may then be repeated using each CI in the first level. Any CI having a "hosting", "contained by", or "dependent on" relationship with a CI that, in turn, has a first level topological relationship with the particular CI, is identified as having a second level topological relationship with the particular CI. As such, each of these CIs are assigned a median topological relationship score, which is relatively lower topological relationship score compared to CIs having the first level topological relationship with the particular CI. For the example indicated in Table 1, a single CI is identified as having a second level topological relationship with the particular CI. As such, the CI is assigned a relatively lower topological relationship score (e.g., 2), compared to CIs having a first level topological relationship with the particular CI.

Once the second level of CIs is identified and scored, the topological scoring process may then be repeated for each CI having a second level topological relationship with the particular CI. Any CI having a "hosting", "contained by", or "dependent on" relationship with a CI that, in turn, has a second level topological relationship with the particular CI is identified as having a third level topological relationship with the particular CI. Each of the CIs having the third level topological relationship with the particular CI are assigned a relatively lower topological relationship score, compared to CIs having a first or second level topological relationship with the particular CI. For the example illustrated in Table 1, two CIs are identified as having a third level topological relationship with the particular CI, and are assigned a relatively lower topological relationship score (e.g., 1), compared to CIs having a first or second level topological relationship with the particular CI. It may be noted that, while in the present example, the topological analysis of block 102 proceeds through three levels of topological relationships, in other embodiments, the topological analysis of block 102 may include any suitable number of levels (e.g., 4, 5, 6, 7, 8, or more). Furthermore, in other embodiments, different CIs within the same topological level may receive a different topological relationship score based on the nature of the relationship (e.g., "hosting" and "contained by" relationships are awarded higher scores than "dependent on" relationships, or vice versa).

For the embodiment illustrated in FIG. 5, the process 100 continues with the client instance 42 identifying and scoring (block 104) a second group of CIs having an alert group relationship with the particular alert. As used herein, an "alert group relationship" is a relationship between an alert group associated with the particular alert and an alert group associated with CIs of the CMDB. For example, within the client instance 42 associated with the CMDB platform 20, an alert and/or CI can be associated an alert group, wherein each alert group has a type, such as "rule-based", "automated", "manual", or "CMDB". Rule-based alert group types are grouped according to compliance with alert correlation rules, while automated alert groups are automatically aggregated and include a virtual alert that is created and added as the primary alert of the group. Manual alert group types are manually grouped (e.g., based on instructions by an authorized user). CMDB alert group types are group based on CI relationship in the CMDB and are used to group alerts generated by CIs that lack historical data. Accordingly, when the particular alert is determined to belong to a particular alert group, the client instance 42 identifies all CIs that also belong to this alert group, regardless of the alert group type. Additionally, it may be appreciated that, in certain embodiments, alert group relationships can be used to enable temporal correlations between alerts and CIs.

As indicated in block 104, the client instance 42 determines a respective alert group relationship score for each CI of the second group of CIs based on an alert group of the CI and an alert group of the particular alert. An example of the second group is indicated by Table 2. Accordingly, each record in Table 2 includes an alert group relationship score field storing a positive integer value that is indicative the strength of the alert group relationship between the indicated CI and the particular CI). For the example illustrated in Table 2, a four CIs are identified as being in the same alert group as the particular alert and are assigned the same alert group relationship score (e.g., 2).

TABLE 2

Example of alert group relationship scoring.

| Configuration Item (CI) Identifier | Alert Group Relationship Score |
|---|---|
| <CI 1> | 2 |
| <CI 6> | 2 |
| <CI 7> | 2 |
| <CI 5> | 2 |

Continuing through the embodiment of the process 100 illustrated in FIG. 5, the client instance 42 subsequently combines or sums (block 106) the respective first score and the respective second score for corresponding CIs of the first and second groups of CIs to generate a third group of CIs, each having a respective combined score. It may be appreciated that, in certain embodiments, the first group and the second group may include different CIs associated with the CMDB, and as such, there may not be a one-to-one correspondence between CIs in the first group and CIs in the second group. For the example indicated in Tables 1 and 2, while both tables reference CI 1 and CI 5, the first group indicated in Table 1 does not include an identifier for CI 6 or CI 7, while the second group indicated in Table 2 does not include an identifier for CI 2, CI 3, or CI 4.

An example of the third group of CIs is indicated in Table 3. Like Tables 1 and 2, each record in the Table 3 includes a respective value for a CI identifier field that uniquely identifies a CI in the CI table 64. Table 3 includes a combined score field that stores a positive integer value that is indicative of the combined strength of the topological and the alert group relationship between the indicated CI and the particular CI. Since there is not a one-to-one correspondence between CIs in the first group and CIs in the second group for the illustrated example, certain CIs of Table 3 only have a topological relationship score, certain CIs only have an alert group relationship score, and certain CIs have both a topological and an alert group relationship score.

TABLE 3

Example of combined relationship scoring.

| Configuration Item (CI) Identifier | Combined Relationship Score | Related to Particular CI |
| --- | --- | --- |
| <CI 1> | 3 + 2 = 5 | TRUE |
| <CI 2> | 3 + 0 = 3 | TRUE |
| <CI 3> | 2 + 0 = 2 | FALSE |
| <CI 4> | 1 + 0 = 1 | FALSE |
| <CI 5> | 1 + 2 = 3 | TRUE |
| <CI 6> | 0 + 2 = 2 | FALSE |
| <CI 7> | 0 + 2 = 2 | FALSE |

Continuing through the embodiment illustrated in FIG. 5, the client instance 42 then identifies or selects (block 108) related CIs from the third group of CIs based on the respective combined score of each CI in the third group. For example, in certain embodiments, the client instance 42 determines that all CIs having a score greater than a threshold value are related to the particular CI. For the example indicated in Tables 1-3, the client instance 42 determines that all CIs of the third group having a total or combined score that is greater than or equal to a predetermined value (e.g., 3) are related to the particular CI, while CIs that are not in the third group, or that are in the third group and have a score that is below the predetermined value, are determined to not be related to the particular CI. To better illustrate this selection, Table 3 includes a "related to particular CI" field that stores a Boolean value that is indicative of whether the indicated CI is related to the particular CI.

Figure 6:
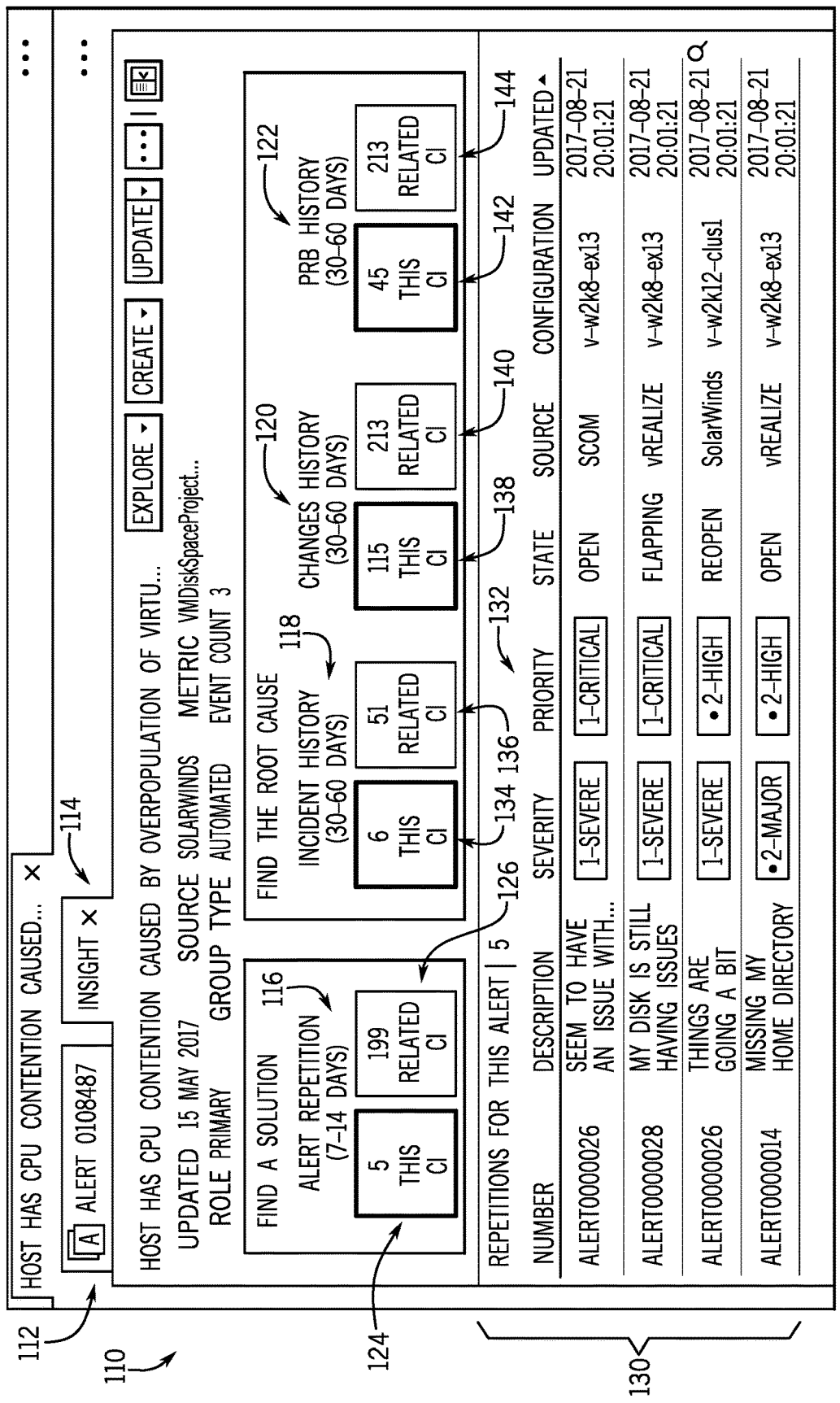
FIG. 6 is a simulated screenshot of an embodiment of a graphical user interface (GUI) that may operate in conjunction with the client instance to provide information to a client device for presentation to a user, in accordance with embodiments of the present technique.

FIG. 6 is a simulated screenshot of an embodiment of a graphical user interface (GUI) 110 that may operate in conjunction with the client instance 42 to provide information to the client device 14D for presentation to a user. In certain embodiments, the GUI 110 may be generated by the client instance 42, or generated by the client device 14D based on information received from the client instance 42, or a combination thereof. For example, the GUI 110 may be presented to the user of the client device 14D in response to the user selecting a particular CI and a particular alert, and then selecting an option for "Alert Insight." The illustrated GUI 110 includes an alert tab 112 (which is not in focus in FIG. 6) that is designed to provide information regarding a particular alert, and an insight tab 114 (which is in focus in FIG. 6) that presents the frequency data discussed above. It may be appreciated that the information presented on the insight tab 114 of the GUI 110 may be generated by the client instance 42 according to the process 80 of FIG. 4, discussed above.

More specifically, the embodiment of the GUI 110 illustrated in FIG. 6 has a number of widgets, including: an alert widget 116, an INT widget 118, a CHG widget 120, and a PRB widget 122. Widgets 116, 118, 120, and 122 are configured to present frequency data for alerts, INTs, CHGs, and PRBs, respectively, associated with either the particular CI or for related CIs. Accordingly, for the illustrated embodiment, the alert widget 116 includes a first field 124 (e.g., displaying a value of 5) that indicates a number of times that the particular CI has been associated with the particular alert during a predetermined time window (e.g., previous 7-14 days). The alert widget 116 also includes a second field 126 (e.g., displaying a value of 199) that indicates a number of times that related CIs have been associated with the particular alert within the same predetermined time window (e.g., previous 7-14 days). Additionally, for the illustrated embodiment, the first field 124 has been selected by the user (e.g., via a previous user input, such as mouse click), and as such an issue detail section 130 of the GUI 110 includes a table 132 that presents details (e.g., number, description, severity, priority, state, source, and so forth) regarding the 5 alerts (only 4 alerts illustrated) that correspond to both the particular alert and the particular CI. When the second field 126 of the alert widget 116 is selected, the table 132 in the issue detail section 130 of the GUI 110 is configured to present details regarding the 199 alerts that correspond to both the particular alert and the related CIs.

For the embodiment illustrated in FIG. 6, the INT widget 118 includes a first field 134 (e.g., displaying a value of 6) that indicates a number of times that an INT has been associated with the particular CI and the particular alert within a predetermined time window (e.g., previous 30-60 days). The INT widget 118 also includes a second field 136 (e.g., displaying a value of 51) that indicates a number of times that the related CIs have been associated with INTs that are also associated with the particular alert within the predetermined time window (e.g., previous 30-60 days). When the first field 134 of the INT widget 118 is selected, the table 132 in the issue detail section 130 of the GUI 110 is configured to present details regarding the 6 INTs that correspond to both the particular alert and the particular CI. When the second field 136 of the INT widget 118 is selected, the table 132 in the issue detail section 130 of the GUI 110 is configured to present details regarding the 51 INTs that correspond to both the particular alert and the related CIs.

The CHG widget 120 includes a first field 138 (e.g., displaying a value of 115) that indicates a number of CHGs associated with the particular CI within a predetermined time window (e.g., previous 30-60 days). The CHG widget 120 also includes a second field 140 (e.g., displaying a value of 213) that indicates a number of CHGs associated with the related CIs within the predetermined time window (e.g., previous 30-60 days). When the first field 138 of the CHG widget 120 is selected, the table 132 in the issue detail section 130 of the GUI 110 is configured to present details regarding the 115 CHGs that correspond to the particular CI. When the second field 140 of the CHG widget 120 is selected, the table 132 in the issue detail section 130 of the GUI 110 is configured to present details regarding the 213 CHGs that correspond to the related CIs.

The PRB widget 122 includes a first field 142 (e.g., displaying a value of 45) that indicates a number of PRBs associated with the particular CI within a predetermined time window (e.g., previous 30-60 days). The PRB widget 122 also includes a second field 144 (e.g., displaying a value of 213) that indicates a number of PRBs associated with the related CIs within the predetermined time window (e.g., previous 30-60 days). When the first field 142 of the PRB widget 122 is selected, the table 132 in the issue detail section 130 of the GUI 110 is configured to present details regarding the 45 PRBs that correspond to the particular CI. When the second field 144 of the PRB widget 122 is selected, the table 132 in the issue detail section 130 of the GUI 110 is configured to present details regarding the 213 PRBs that correspond to the related CIs.

The technical effects of the present disclosure include improving a user's ability to explore a root cause, as well as determine a solution for, a particular alert associated with a particular CI of a CMDB. Present embodiments include instructions that enable a client instance to determine CIs that are related to a particular CI, for example, based on a combination of a topological relationship and an alert group relationship between the particular CI and the other CIs associated with the client instance. Accordingly, when the particular CI experiences the particular alert, present embodiments enable the client instance to determine how frequently the CI has experienced potentially relevant issues, as well as how frequently related CI have experienced other potentially relevant issues, wherein the relevant issues may be helpful to the user in understanding and/or resolving the particular alert for the particular CI. Additionally, present embodiments include a GUI designed to concurrently present frequency data for issues associated with the particular CI and related CIs.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
at least one processor configured to execute stored instructions to perform operations comprising:
receiving a request from a client device identifying a particular configuration item (CI) of a plurality of CIs and a particular alert of a plurality of alerts;
identifying one or more CIs of the plurality of CIs as being related to the particular CI based on the particular CI and the particular alert by:
determining a respective topological relationship score based at least in part on a respective topological relationship between each CI of the plurality of CIs and the particular CI;
determining a respective alert group relationship score based at least in part on an alert group relationship between each CI of the plurality of CIs and the particular alert;
combining the respective topological relationship score and the respective alert group relationship score to generate a respective combined score for each CI of the plurality of CIs; and
identifying the one or more CIs as being related to the particular CI based at least in part on the respective combined score of each CI of the one or more CIs being greater than a threshold value;
identifying one or more issues that are associated with the particular CI, the one or more CIs identified as being related to the particular CI, or a combination thereof;
determining frequency data for the one or more issues associated with the particular CI, the one or more CIs identified as being related to the particular CI, or the combination thereof; and
sending a response to the client device, wherein the response includes the frequency data for the one or more issues associated with the particular CI, the one or more CIs identified as being related to the particular CI, or the combination thereof.

2. The computing system of claim 1, wherein, to determine the respective alert group relationship score, the at least one processor is configured to execute the stored instructions to perform operations comprising:
determining an alert group associated with the particular alert;
determining alert group CIs of the plurality of CIs that are associated with the alert group; and
assigning each of the alert group CIs a similar respective alert group relationship score based on being associated with the alert group of the particular alert.

3. The computing system of claim 1, comprising at least one memory configured to store a configuration management database (CMDB), wherein the CMDB comprises a first table configured to store the plurality of CIs and comprises a second table configured to store the plurality of alerts.

4. The computing system of claim 3, wherein, to determine the respective topological relationship score, the at least one processor is configured to execute the stored instructions to perform operations comprising:
referencing the first table, and wherein determining the respective alert group relationship score comprises referencing the second table.

5. The computing system of claim 1, wherein, to determine the respective topological relationship score, the at least one processor is configured to execute the stored instructions to perform operations comprising:
determining first level CIs of the plurality of CIs having a first level topological relationship with the particular CI;
determining second level CIs of the plurality of CIs having a second level topological relationship with the particular CI based on the first level CIs;
determining third level CIs of the plurality of CIs having a third level topological relationship with the particular CI based on the second level CIs; and
assigning each CI of the plurality of CIs a respective topological score, wherein topological scores assigned to second level CIs is less than topological scores assigned to first level CIs and topological scores assigned to third level CIs is less than topological scores assigned to second level CIs.

6. The computing system of claim 1,
wherein the one or more issues correspond to past incidents, past changes, and/or past problems of the particular CI, the one or more CIs identified as being related to the particular CI, or the combination thereof.

7. The computing system of claim 6, wherein, to determine the frequency data, the at least one processor is configured to execute the stored instructions to perform operations comprising: counting the past incidents, the past changes, and/or the past problems that occurred within a time window.

8. The computing system of claim 1, wherein the at least one processor is configured to execute the stored instructions to perform operations comprising:
determining a root cause of the particular alert based at least in part on the frequency data for the one or more issues associated with the particular CI, the one or more CIs identified as being related to the particular CI, or the combination thereof.

9. The computing system of claim 1, wherein sending the response to the client device comprises providing one or more widgets on a graphical user interface (GUI) to the client device, wherein the one or more widgets are configured to present the frequency data for display.

10. A computer-implemented method, comprising:
receiving a request from a client device identifying a particular configuration item (CI) of a plurality of CIs and a particular alert of a plurality of alerts;
identifying one or more CIs of the plurality of CIs as being related to the particular CI based on the particular CI and the particular alert by:
determining a respective topological relationship score based at least in part on a respective topological relationship between each CI of the plurality of CIs and the particular CI;
determining a respective alert group relationship score based at least in part on an alert group relationship between each CI of the plurality of CIs and the particular alert;
combining the respective topological relationship score and the respective alert group relationship score to generate a respective combined score for each CI of the plurality of CIs; and
identifying the one or more CIs as being related to the particular CI based at least in part on the respective combined score of each CI of the one or more CIs;
identifying one or more issues that are associated with the particular CI, the one or more CIs identified as being related to the particular CI, or a combination thereof;
determining frequency data for the one or more issues associated with the particular CI, the one or more CIs identified as being related to the particular CI, or the combination thereof; and
sending a response to the client device, wherein the response comprises the frequency data for the one or more issues associated with the particular CI, the one or more CIs identified as being related to the particular CI, or the combination thereof.

11. The computer-implemented method of claim 10, comprising:
determining first level CIs of the plurality of CIs having a first level topological relationship with the particular CI;
determining second level CIs of the plurality of CIs having a second level topological relationship with the particular CI based on the first level CIs;
determining third level CIs of the plurality of CIs having a third level topological relationship with the particular CI based on the second level CIs; and
assigning each CI of the plurality of CIs a respective topological score, wherein topological scores assigned to second level CIs is less than topological scores assigned to first level CIs and topological scores assigned to third level CIs is less than topological scores assigned to second level CIs.

12. The computer-implemented method of claim 10, wherein sending the response to the request to the client device comprises providing one or more widgets on a graphical user interface (GUI) to the client device, wherein the one or more widgets are configured to present the frequency data.

13. The computer-implemented method of claim 12, wherein the one or more widgets comprises an alert widget configured to indicate, via a first visualization, a first number of alerts associated with the particular alert and the particular CI and to indicate, via a second visualization, a second number of alerts associated with the particular alert and the one or more CIs identified as being related to the particular CI.

14. The computer-implemented method of claim 10, comprising:
determining an alert group associated with the particular alert;
determining alert group CIs of the plurality of CIs that are associated with the alert group; and
assigning each of the alert group CIs a similar respective alert group relationship score based on being associated with the alert group of the particular alert.

15. The computer-implemented method of claim 10, wherein the one or more issues correspond to past incidents, past changes, and/or past problems of the particular CI, the one or more CIs identified as being related to the particular CI, or the combination thereof, wherein determining the frequency data comprises counting the past incidents, the past changes, and/or the past problems that occurred within a time window.

16. A non-transitory, computer-readable medium storing instructions executable by one or more processors of a computing system, wherein the instructions comprise instructions to:
receive a request from a client device to identify a particular configuration item (CI) of a plurality of CIs and a particular alert of a plurality of alerts;
identify one or more CIs of the plurality of CIs as being related to the particular CI based on the particular CI and the particular alert by:
determining a respective topological relationship score based at least in part on a respective topological relationship between each CI of the plurality of CIs and the particular CI;
determining a respective alert group relationship score based at least in part on an alert group relationship between each CI of the plurality of CIs and the particular alert;
combining the respective topological relationship score and the respective alert group relationship score to generate a respective combined score for each CI of the plurality of CIs; and
identifying the one or more CIs as being related to the particular CI based at least in part on the respective combined score of each CI of the one or more CIs;

identify one or more issues associated with the particular CI, the one or more CIs identified as being related to the particular CI, or a combination thereof;

determine frequency data for the one or more issues associated with the particular CI, the one or more CIs identified as being related to the particular CI, or the combination thereof; and send a response to the client device, wherein the response comprises the frequency data for the one or more issues associated with the particular CI, the one or more CIs identified as being related to the particular CI, or the combination thereof.

17. The non-transitory, computer-readable medium of claim 16, wherein the instructions to determine the respective topological relationship score comprise instructions to:

determine first level CIs of the plurality of CIs having a first level topological relationship with the particular CI;

determine second level CIs of the plurality of CIs having a second level topological relationship with the particular CI based on the first level CIs;

determine third level CIs of the plurality of CIs having a third level topological relationship with the particular CI based on the second level CIs; and assign each CI of the plurality of CIs a respective topological score, wherein topological scores assigned to second level CIs is less than the topological scores assigned to first level CIs and topological scores assigned to third level CIs is less than topological scores assigned to second level CIs.

18. The non-transitory, computer-readable medium of claim 16, wherein the instructions to determine the respective alert group relationship score comprise instructions to:

determine an alert group associated with the particular alert;

determine alert group CIs of the plurality of CIs that are associated with the alert group; and assign each of the alert group CIs a similar respective alert group relationship score based on being associated with the alert group of the particular alert.

19. The non-transitory, computer-readable medium of claim 16, wherein the one or more issues correspond to past incidents, past changes, and/or past problems of the particular CI, the one or more CIs identified as being related to the particular CI, or the combination thereof.

20. The non-transitory, computer-readable medium of claim 19, wherein the instructions to determine the frequency data comprise instructions to count the past incidents, the past changes, and/or the past problems that occurred within a time window.

* * * * *